United States Patent [19]

Biondetti

[11] 4,186,472

[45] Feb. 5, 1980

[54] SUPPORT ELEMENT FOR CONTROLLED DEFLECTION ROLL

[75] Inventor: Mario Biondetti, Schio, Italy

[73] Assignee: Escher Wyss Limited, Zürich, Switzerland

[21] Appl. No.: 908,170

[22] Filed: May 22, 1978

[30] Foreign Application Priority Data

Jun. 2, 1977 [CH] Switzerland .................. 6774/77

[51] Int. Cl.² ............................................ B21B 31/32
[52] U.S. Cl. ......................... 29/113 AD; 29/116 AD
[58] Field of Search ...... 29/113 AD, 116 AD, 116 R, 29/117, 126; 91/488; 92/58, 172

[56] References Cited

U.S. PATENT DOCUMENTS

| 3,802,044 | 4/1974 | Spillman et al. | 29/113 AD |
| 3,846,883 | 11/1974 | Biondetti | 29/116 AD |
| 3,885,283 | 5/1975 | Biondetti | 29/116 AD |
| 3,997,953 | 12/1976 | Christ et al. | 29/116 AD |

Primary Examiner—Louis Rimrodt
Attorney, Agent, or Firm—Werner W. Kleeman

[57] ABSTRACT

A support or pressure element for a controlled deflection roll, comprising a cylindrical piston section intended to be guided in a cylinder bore of a stationary support, a contact or shoe section intended to bear against the inner surface of a roll shell rotatable about the support, and a contact or bearing surface in the form of a section of a cylinder surface where there are formed at least three hydrostatic bearing pockets. The bearing pockets flow communicate by channels with a surface of the piston section located in a cylinder chamber of the related cylinder bore. At least one of the channels possesses at least one portion which extends from a peripheral surface or region of the piston section at an inclination with respect to the lengthwise axis of such piston section closer to such axis. The mouth of the channel portion at the peripheral surface or region of the piston section is located near to the location which is essentially furthest from the plane of the axes of the contact or bearing surface and the piston section.

6 Claims, 7 Drawing Figures

SUPPORT ELEMENT FOR CONTROLLED DEFLECTION ROLL

BACKGROUND OF THE INVENTION

The present invention broadly relates to controlled deflection rolls, also referred to in the art as rolls with bending compensation, and, more specifically, relates to a new and improved construction of a support or pressure element for such controlled deflection roll.

The support or pressure element is of the type comprising a substantially cylindrical piston section or portion intended to be guided in a substantially cylindrical bore of a stationary support, typically a stationary shaft, a contact or shoe section or portion intended to bear against the inner surface of a roll shell rotatable about the stationary support, and a contact or bearing surface in the form of a section of a cylindrical surface. At the contact or bearing surface there are formed at least three hydrostatic bearing pockets which are distributed in the manner of a multi-point support, the bearing pockets being connected by channels with a surface of the piston section located in a cylinder chamber or compartment of the related cylinder bore.

Such type pressure or support element has been disclosed, for instance in U.S. Pat. No. 3,802,044, granted Apr. 9, 1974. With this prior art construction of pressure or support element there are arranged in a segment-like fashion four pockets, and the throttle channels extend parallel to one another and to the axis of the piston section.

With this state-of-the-art construction there exists the drawback that in the case of system designs wherein the axes of the pressure elements are not vertical, there can be formed air cushions, which, owing to their elasticity, adversely effect the working behavior of the controlled delfection roll, especially its damping effect as concerns oscillations.

SUMMARY OF THE INVENTION

Hence, with the foregoing in mind, it is a primary object of the present invention to provide an improved construction of pressure or support element for a controlled deflection roll which is not associated with the aforementioned drawbacks and limitations of the prior art proposals.

Another and more specific object of the invention aims at the provision of a new and improved construction of pressure or support element of the previously mentioned type which enables an extensive venting of the cylinder bore in which it is located, and specifically, for all spatial arrangements of the controlled deflection roll in which it is mounted in conjunction with other similar pressure or support elements, i.e., especially if, for instance, its piston section or portion extends horizontally.

Now in order to implement these and still further objects of the invention, which will become more readily apparent as the description proceeds, the inventive pressure or support element of the present development is manifested by the features that at least one of the channels has at least one portion or section which extends from or at least near to the marginal or peripheral region or surface of the piston section at an inclination with regard to the axis of the piston section and through a location situated closer to such axis. The mouth of this channel portion is located at or close to the marginal or peripheral surface or region of the piston section near to the location which is situated essentially furthest from the plane of the axes of the contact or bearing surface and the piston section.

By virtue of this arrangement there can be beneficially achieved the result that with suitable arrangement of the pressure element in the support of the controlled defelction roll the end of the relevant channel is dispositioned at a region of the cylinder bore where an air cushion can form. Therefore, with the influence of the infed hydraulic pressurized fluid medium, which expels the air, there is rendered possible a considerably improved venting of the cylinder bore than was heretofore possible.

Preferably the channel can be linear and located at an inclination to the axis of the piston section. Such channel can be easily fabricated with the aid of a single inclined bore.

The channel can lead from the marginal or peripheral region of the piston section into a bearing pocket arranged essentially opposite thereto. In this way there is achieved the advantage that the throttle channel, owing to its inclined position, can be longer than heretofore was possible. The channel, which has a throttling action, as has been described in detail in the aforementioned U.S. Pat. No. 3,802,044, granted Apr. 9, 1974, for the same flow resistance can have a larger diameter. This reduces the danger of clogging of the channel by contaminants in the oil or other pressurized fluid medium.

According to a preferred construction there can be formed in conventional fashion at the contact or shoe section or portion four bearing pockets which are separated from one another by two crosswise arranged separation or partition walls. The channels of bearing pockets located diametrically opposite to one another are guided crosswise relative to one another and to the axis of the piston section in planes extending parallel to such axis. Further, the channels of both remaining bearing pockets likewise are guided crosswise in parallel planes. Such type construction is easily fabricatable with the aid of uncomplicated devices owing to the symmetry of the angle and the parallelism of the planes in which the channels extend. Due to such symmetry there is also insured for essentially similar length of the channels and their uniform flow resistance.

According to an embodiment of the invention which is especially advantageous as concerns fabrication of the pressure or support element, the piston section can have a plug-shaped projection upon which there is mounted or seated a cylindrical bushing, and the channel or channels extends out of the region of the edge of margin of the projection.

BRIEF DESCRIPTION OF THE DRAWINGS

The invention will be better understood and objects other than those set forth above, will become apprent when consideration is given to the following detailed description thereof. Such description makes reference to the annexed drawings wherein.

DETAILED DESCRIPTION OF THE PREFERRED EMBODIMENTS

Figure 1:
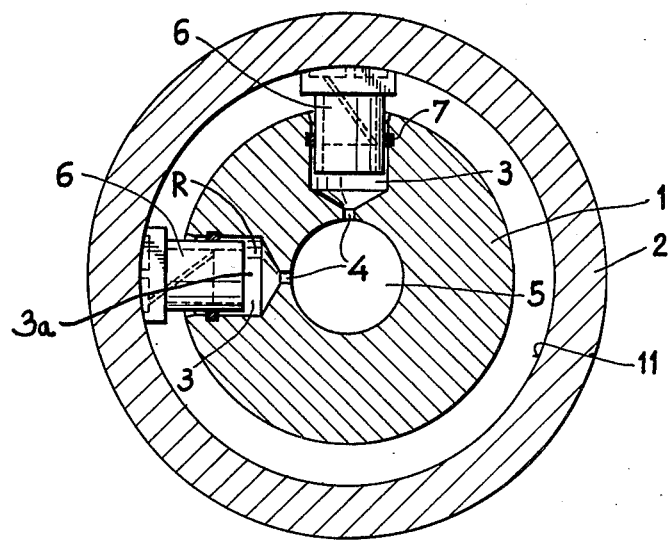
FIG. 1 is a cross-section view through a controlled deflection roll which for instance is of the type disclosed in the aforementioned U.S. Pat. No. 3,802,044, granted Apr. 9, 1974, and wherein there are employed the pressure or support elements constructed according to the teachings of the present invention.

Describing now the drawings, in FIG. 1 there is illustrated in sectional view a controlled deflection roll which, for instance, is of the type disclosed in detail in the aforementioned U.S. Pat. No. 3,802,044, granted Apr. 9, 1974. The controlled deflection roll shown by way of example in FIG. 1 will be seen to comprise a stationary support 1, for instance in the form of a stationary shaft, which is supported in any suitable, conventional manner, which therefore has not been particularly shown, in a frame. Rotatably mounted about the support 1 is a roll shell 2, which, for instance, can be rotatably mounted at its ends at the support 1 in the manner disclosed by way of example in the aforementioned U.S. Pat. No. 3,802,044. However, it is also possible to provide guiding of the roll shell 2 in relation to the support or carrier 1 in accordance with the teachings of U.S. Pat. No. 3,885,283, granted May 27, 1975. As to these two U.S. Pat. Nos. 3,802,004 and 3,885,283, reference may be readily had thereto for further details of the construction of a possible controlled deflection roll with which the support or pressure elements of the present invention may be used, and the disclosure of which patents is incorporated herein by reference.

Now at the support or carrier 1 there are provided cylinder bores 3 defining cylinder chambers or compartments 3a. These cylinder bores 3 are preferably of cylindrical configuration and flow communicate by means of the connection bores or passages 4 with an axial pressurized medium channel 5. Slidingly supported by means of seals 7 in the cylinder bores 3 are the sliding pressure or support elements 6. These seals 7 seal the intermediate space or chamber between the pressure or support element 6 and the related cylinder bore 3. Apart from performing the sealing function, the seals 7 also at the same time allow for a certain inclination of the pressure or support elements 6 in the cylinder bores 3.

Reverting further to FIG. 1, it will be understood that for reasons of clarity in illustration there have been shown two cylinder bores 3 with support elements 6, the cylinder bores 3 being offset in relation to one another through an angle of approximately 90°, and which correspond to two rows of bores and support elements. As a general rule, however, a controlled deflection roll is only equipped with one row of such pressure or support elements 6.

As further apparent by referring to FIG. 1, the danger exists for the pressure or support element 6 arranged at the left side of the cross-section of the controlled deflection roll with their axes disposed essentially horizontally, that at the upper region R of the cylinder bores 3 air will tend to collect which, during operation, only can escape slowly along with the throughflowing pressurized fluid medium, assumed to be pressurized oil. This air leads to an undesired elasticity of the support of the roll shell 2 at the pressure or support elements 6, which can lead to oscillations or can impair the otherwise prevailing damping effect of the controlled deflection roll with regard to such undesired oscillations.

As will be evident from the disclosure up to this point, the crux of the invention is directed to improving the design of such pressure or support elements, especially with the view of avoiding or minimizing such undesired effects. Now in FIGS. 2 and 3 there is shown a construction of inventive pressure or support element 6. According to the showing of FIG. 2 the pressure or support element 6 will be seen to have a substantially cylindrical piston section or portion 8 as well as a contact or shoe section 10 intended to bear at the cylindrical inner surface 11 of the roll shell 2. For this purpose, the contact section or portion 10 is provided with a contact or bearing surface 12 having the shape of a section of a cylindrical surface with the radius R which is equal to the radius of the inner surface 11 of the roll shell 2. The aforementioned section of the cylindrical surface or cylinder forming the contact or bearing surface 12 has an axis A which, during operation, coincides with the axis of the roll shell 2.

Figure 2:
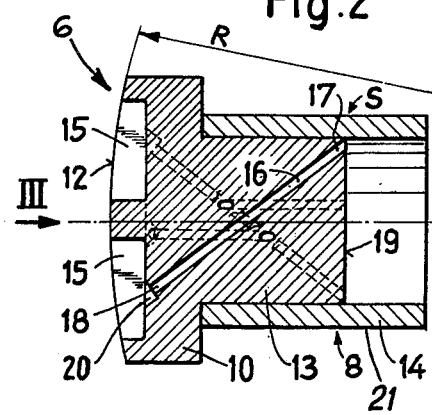
FIG. 2 is a cross-sectional view through a pressure or support element of the type shown in FIG. 1, taken substantially along the line II—II of FIG. 3.
Figure 3:
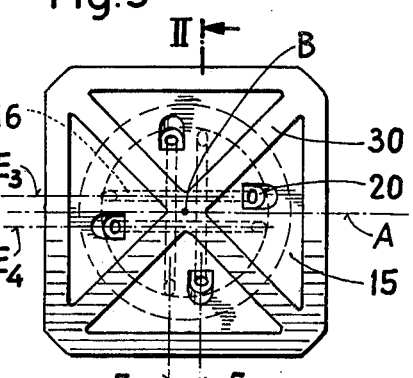
FIG. 3 is an end view of the pressure or support element shown in FIG. 2, looking in the direction of the arrow III thereof.

As also will be best understood by referring to FIGS. 2 and 3, the piston section 8, with the exemplary embodiment shown in such Figures, will be seen to comprise a substantially cylindrical plug-shaped projection 13 having an axis B which axis B also constitutes the lengthwise axis of the piston section 8 and also the pressure element 6 as well as a substantially cylindrical bushing or sleeve 14 which is seated, for instance by being shrunk-fitted, onto such projection 13. The bushing or sleeve 14 can be fabricated from hardened steel and have a ground cylindrical surface.

The contact or bearing surface 12 is provided, in the exemplary embodiment under discussion, with four hydrostatic bearing pockets 15. These bearing pockets 15 are flow connected i.e., flow communicate by means of the throttle channels 16 with the surface of the related pressure element 6 which, during operation, is located in the cylindrical chamber or compartment 3a of the bore 3. In the case under consideration, the mouths 17 of the throttle channel 16 are located at the end surface 19 of the plug-shaped projection 13. The other ends 18 of these throttle channels or bores 16 are provided with enlarged portions 20 formed by milling or any other suitable machining operation.

Still considering FIGS. 2 and 3 and as will be seen by referring thereto, the four throttle channels 16 intersect the axis B of the piston section or portion 8 and extend at an inclination with regard to such axis B. As will be particularly well seen by referring to FIG. 3, in each case two throttle channels 16 are located in two parallel planes $E_1$, $E_2$ and $E_3$, $E_4$, respectively. Two of these planes, i.e., the planes $E_1$ and $E_2$, in the arrangement of FIG. 3, are located perpendicular to the cylinder axis A of the contact or bearing surface 12.

By virtue of the foregoing construction there is provided an arrangement wherein for each position of the pressure or support element 6, in each case, a channel 16 extends from a point close to an upper location S of the marginal or peripheral region or surface 21 of the piston section 8, which is located essentially furthest from the plane x of both axes A and B, at an inclination to the axis B of the piston section 8, and specifically closer to such axis. The channel 16 leads into a bearing pocket 15 which is arranged essentially diametrically opposite the location S. Consequently, there is realized a higher position of the mouth 17 of the piston section or portion 8, as such would be otherwise possible for the heretofore known construction of channels which are parallel to one another and to the axis B, for instance as taught in the aforementioned U.S. Pat. No. 3,802,044, granted Apr. 9, 1974.

Now if during operation such type pressure or support element 6 has pressurized oil infed thereto from the line or conduit 5 through the connection channel or bore 4, then the air located in the cylinder bore 3 can escape through the throttle channel 16 leading from the location S. Owing to the symmetrical construction of the channels 16 located in the planes $E_1$ and $E_2$, there prevails also the same effect even if the support or pressure element 6 is reversibly mounted in the support 1, i.e., is arranged such that the side located downwardly in the showing of FIGS. 2 and 3 is then located upwardly. Therefore, during the assembly or installation of the pressure or support element 6 in the controlled deflection roll it is unnecessary to pay any particular attention to the position of such pressure element 6. They need only be mounted such that the axis A of the contact or bearing surface 12 extends essentially parallel to the axis of the support 1 and the roll shell 2.

The arrangement of both remaining throttle channels 16 in the planes $E_3$ and $E_4$ enables constructing all four of the channels 16 so as to have the same length, so that with the same diameter they also have the same pressure drop.

Figure 4:
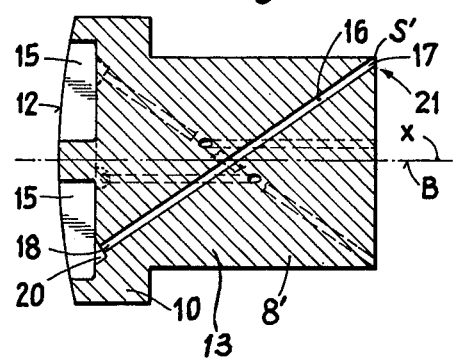
FIG. 4 is a sectional view, corresponding to the showing of FIG. 2, of a different embodiment of pressure or support element.
Figure 5:
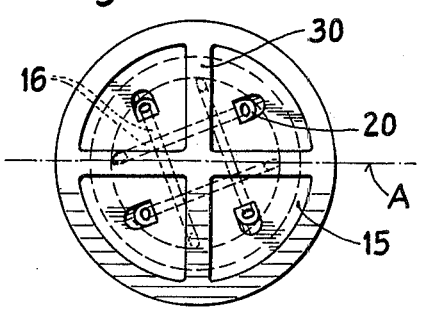
FIG. 5 is an end view, corresponding to the showing of FIG. 3, of the pressure or support element shown in FIG. 4.

Now the embodiment shown in FIGS. 4 and 5 differs from the previously explained embodiment discussed especially with reference to FIGS. 2 and 3, predominantly by virtue of the fact that according to the showing of FIG. 4 the cylindrical bushing 14, used in the arrangement of FIGS. 2 and 3, here is omitted and the piston section or portion 8', formed by the substantially cylindrical plug-shaped projection 13, is directly guided at the seal or seal means 7. Additionally, with regard to the cylinder axis A of the surface 12, the crosswise arranged partition or separation walls 30, which are disposed at an inclination or obliquely with regard to the axis A of the arrangement of FIG. 3, in FIG. 5 are disposed perpendicular and parallel to such axis A. Furthermore, the throttle channel 16, which otherwise are constructed similar to the throttle channels 16 of the arrangement of FIGS. 2 and 3, lead from the highest location S' and the lowest location, respectively, and from the lateral apex or peak locations of the piston portion or section 8' to the bearing pockets 15, which are essentially diametrically oppositely situated with regard to such locations. Also here the bores or channels 16 always extend in two essentially parallel planes, and of which each pair are located perpendicular or at right angles to one another, and correspond to the planes $E_1$, $E_2$ and $E_3$ and $E_4$ of the arrangement of FIG. 3. In this case, however, the planes are located at an inclination or obliquely with respect to the axis A of the contact or bearing surface 12.

Figure 6:
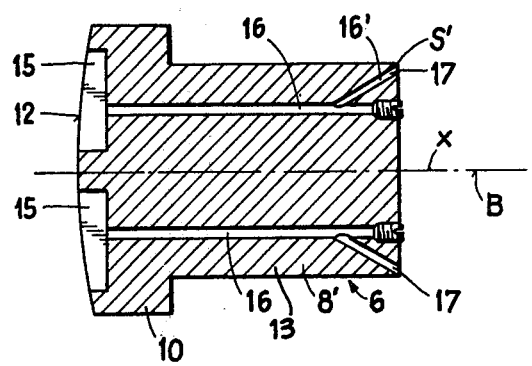
FIG. 6 is a sectional view, corresponding to the showing of FIGS. 2 and 4, of a different embodiment of pressure of support element.

Now in FIG. 6 there is shown a possible embodiment wherein part of the channel or bore 16 extends parallel to the axis B of the piston portion or section 8. The connection with the location S' is accomplished by means of a channel section or portion 16' which extends at an inclination with regard to the axis B of the piston portion or section 8' and specifically closer to such axis. Also in this case there is provided a symmetrical arrangement of the channels 16 with regard to the plane x, so that each such pressure or support element 6 also can be reversibly mounted.

Figure 7:
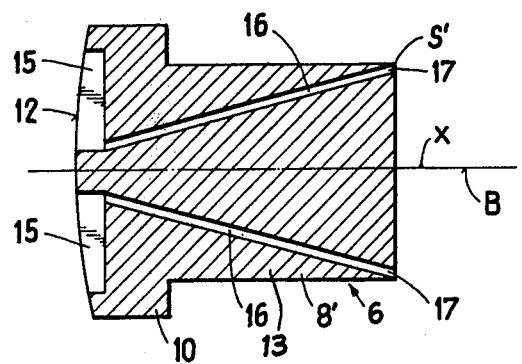
FIG. 7 is a sectional view of a still further embodiment of pressure or support element.

Finally, in the embodiment of FIG. 7 the same will be understood to differ from that of FIG. 4 essentially by virtue of the fact that the channels or bores 16 do not lead to diametrically oppositely situated hydrostatic bearing pockets 15, rather open into pockets which are located at the same side of the axis B and the plane x as the mouth portions or mouths 17. Hence, there are formed somewhat shorter channels 16, but however in each case two such channels can lie in a common plane which extends through the axis B. As a result, under circumstances there can be facilitated the fabrication of such channels.

While there are shown and described present preferred embodiments of the invention, it is to be distinctly understood that the invention is not limited thereto, but may be otherwise variously embodied and practiced within the scope of the following claims.

What I claim is:

1. A pressure element for a controlled deflection roll, comprising:

a substantially cylindrical piston section intended to be guided in a cylinder bore having a cylinder chamber of a stationary support;

a contact section merging with said piston section and intended to bear against an inner surface of a roll shell rotatable about the support;

a contact surface provided for the contact section;

said contact surface comprising a section of a cylinder surface and provided with at least three hydrostatic bearing pockets;

said bearing pockets being provided with channels for flow communicating said bearing pockets with a surface of the piston section located in the cylinder chamber of the related cylinder bore;

said piston section having a lengthwise axis and a peripheral surface;

at least one of said channels possessing at least one portion which extends from a location at least near to said peripheral surface of the piston section at an inclination with respect to the lengthwise axis of said piston section and towards a location situated closer to said lengthwise axis; and said channel portion having a mouth disposed at least near to the peripheral surface of the piston section and at a location situated essentially furthest from the plane of the axes of the contact surface and the piston section.

2. The pressure element as defined in claim 1, wherein:

said at least one channel is linear and extends at an inclination with respect to the lengthwise axis of the piston section.

3. The pressure element as defined in claim 2, wherein:

said at least one channel leads from said location at least near to said peripheral surface of the piston section into one of the bearing pockets arranged essentially opposite thereto.

4. The pressure element as defined in claim 3, wherein:

said contact section is provided with four of said hydrostatic bearing pockets;

said four hydrostatic bearing pockets being separated from one another by two crosswise arranged partition walls;

the channels of diametrically oppositely situated bearing pockets extending crosswise with respect to one another and to the lengthwise axis of the piston section in planes extending essentially parallel to said lengthwise axis; and the channels of the remaining two bearing pockets likewise extending crosswise to one another in essentially parallel planes.

5. The apparatus as defined in claim 1, wherein;

said piston section comprises a plug-like projection and a substantially cylindrical bushing seated upon said plug-like projection;

said plug-projection having an edge; and said at least one channel leading from the region of said edge of said plug-like projection.

6. A pressure element for a controlled deflection roll, comprising:

a substantially cylindrical piston section intended to be guided in a cylinder bore having a cylinder chamber of a stationary support;

a contact section merging with said piston section and intended to bear against an inner surface of a roll shell rotatable about the support;

a contact surface provided for the contact section;

said contact surface comprising a section of a cylinder surface and provided with at least three hydrostatic bearing pockets;

said bearing pockets being provided with channels for flow communicating said bearing pockets with a surface of the piston section located in the cylinder chamber of the related cylinder bore;

said piston section having a lengthwise axis and a peripheral surface;

at least one of said channels possessing at least one portion which extends form a location at least near to said peripheral surface of the piston section at an inclination with respect to the lengthwise axis of said piston section and a location situated closer to said lengthwise axis;

said channel portion having a mouth disposed at least near to the peripheral surface of the piston section; and said mouth and said location situated closer to said lengthwise axis being at respectively different lengthwise axis being at respectively different elevational positions and said mouth being situated further from the plane of the axes of the contact surface and the piston section than said location situated closer to said lengthwise axis.

* * * * *